(12) United States Patent
Mimura et al.

(10) Patent No.: US 8,115,822 B2
(45) Date of Patent: Feb. 14, 2012

(54) IMAGE CAPTURING APPARATUS, FOR DETERMINING A SUBJECT SCENE INCLUDED IN A CAPTURED IMAGE, METHOD FOR CONTROLLING THE SAME, AND PROGRAM THEREFOR

(75) Inventors: Yuko Mimura, Tokyo (JP); Yuji Shimizu, Tokyo (JP)

(73) Assignee: Sony Corporation (JP)

( * ) Notice: Subject to any disclaimer, the term of this patent is extended or adjusted under 35 U.S.C. 154(b) by 433 days.

(21) Appl. No.: 12/378,010

(22) Filed: Feb. 10, 2009

(65) Prior Publication Data
US 2009/0201390 A1 Aug. 13, 2009

(30) Foreign Application Priority Data
Feb. 12, 2008 (JP) ................. P2008-030376

(51) Int. Cl.
*H04N 7/18* (2006.01)
*H04N 5/228* (2006.01)
(52) U.S. Cl. ................. 348/222.1; 348/81
(58) Field of Classification Search .......... 348/81, 348/222.1–225.1, 239
See application file for complete search history.

(56) References Cited

U.S. PATENT DOCUMENTS

| 5,915,133 | A  | * | 6/1999 | Hirai et al. | 396/48 |
|---|---|---|---|---|---|
| 2002/0097441 | A1 | * | 7/2002 | Hara et al. | 358/302 |
| 2003/0026607 | A1 | * | 2/2003 | Okisu et al. | 396/213 |
| 2005/0088542 | A1 | * | 4/2005 | Stavely et al. | 348/239 |
| 2008/0037975 | A1 | * | 2/2008 | Nakajima | 396/104 |
| 2009/0201390 | A1 | * | 8/2009 | Mimura et al. | 348/222.1 |
| 2009/0295945 | A1 | * | 12/2009 | Watanabe et al. | 348/231.99 |
| 2010/0079589 | A1 | * | 4/2010 | Yoshida et al. | 348/81 |
| 2010/0194931 | A1 | * | 8/2010 | Kawaguchi et al. | 348/240.99 |

FOREIGN PATENT DOCUMENTS

JP 2007-019643 A 1/2007

* cited by examiner

*Primary Examiner* — Timothy J Henn
(74) *Attorney, Agent, or Firm* — Lerner, David, Littenberg, Krumholz & Mentlik, LLP

(57) ABSTRACT

An image capturing apparatus includes an image capturing unit configured to capture an image of a subject and generate a captured image of the subject, a feature value extracting unit configured to extract a feature value of the captured image, a scene candidate determining unit configured to determine a scene candidate of a subject scene included in the captured image on the basis of the extracted feature value, and a scene determining unit configured to determine that the scene candidate is the subject scene included in the captured image when the scene candidate determining unit continuously determines scene candidates of an identical kind for a scene determining period taken for determining the subject scene included in the captured image.

18 Claims, 10 Drawing Sheets

| SCENE CANDIDATE (351) | SCENE DETERMINING THRESHOLD (1/10 SEC) (352) |
|---|---|
| UNDERWATER SCENE | 20 (2.0 SEC) |
| NON-UNDERWATER SCENE | 10 (1.0 SEC) |

| SUBJECT SCENE (382) | IMAGE CAPTURING PARAMETER (383) |
|---|---|
| UNDERWATER SCENE | UNDERWATER WHITE BALANCE |
| NON-UNDERWATER SCENE | ORDINAL WHITE BALANCE |

FIG. 9

| SCENE CANDIDATE | | SCENE DETERMINING THRESHOLD (1/10 SEC) |
|---|---|---|
| UNDERWATER SCENE | ORDINAL STATE | 20 (2.0 SEC) |
| | IMMEDIATELY AFTER POWER-ON AND SCENE INFORMATION INDICATING UNDERWATER SCENE | 1 (0.1 SEC) |
| NON-UNDERWATER SCENE | | 10 (1.0 SEC) |

IMAGE CAPTURING APPARATUS, FOR DETERMINING A SUBJECT SCENE INCLUDED IN A CAPTURED IMAGE, METHOD FOR CONTROLLING THE SAME, AND PROGRAM THEREFOR

CROSS REFERENCES TO RELATED APPLICATIONS

The present application claims priority from Japanese Patent Application No. JP 2008-030376, filed in the Japanese Patent Office on Feb. 12, 2008, the entire content of which is incorporated herein by reference.

BACKGROUND OF THE INVENTION

1. Field of the Invention

The present invention relates generally to image capturing apparatuses, and more specifically, to an image capturing apparatus capable of performing image capturing using a plurality of image capturing parameters, a method for controlling the same, and a program for allowing a computer to execute the method.

2. Description of the Related Art

Image capturing apparatuses, such as digital still cameras, that capture images of a subject, such as people and scenery, and record the captured images are widely used. In addition, many watertight cases for protecting image capturing apparatuses from water and realizing underwater image capturing have been proposed. Attaching such a watertight case to an image capturing apparatus allows the image capturing apparatus to be used in the sea, rivers, and the like. Image capturing apparatuses having a waterproof function itself have also been proposed. For example, images of a subject, such as fish swimming in the sea and seaweeds on the seabed, can be captured and recorded with image capturing apparatuses equipped with such a watertight case or image capturing apparatuses having such a waterproof function.

It is known that blue light is more likely to pass through but red light is more likely to attenuate in water. Accordingly, when an automatic white balance control function generally used in air is applied to the underwater use, it is often difficult to obtain stable white balance. To obtain stable white balance in water, image capturing apparatuses capable of performing image capturing using image capturing parameters that realize white balance control processing suitable for an underwater environment have been proposed.

There are image capturing apparatuses that determine whether a current image capturing environment is in water or air to set respective image capturing parameters suitable for an underwater environment. For example, an image capturing apparatus that determines whether a current image capturing environment is in water or air using a detector for detecting attachment of a watertight case or a water pressure sensor for detecting the water pressure has been proposed (see, for example, Japanese Unexamined Patent Application Publication No. 2007-19643 (FIG. 1)).

SUMMARY OF THE INVENTION

According to the related art, a watertight case detector or a water pressure sensor is used to determine whether a current image capturing environment is in water or air. If it is determined that the current environment is in water, image capturing parameters suitable for an underwater environment can be set. In this case, however, dedicated hardware is employed to use the watertight casing detector or the water pressure sensor, which thus leads to an increase in the cost of image capturing apparatuses.

A method for determining whether a scene of a subject (hereinafter, referred to as a subject scene) included in a captured image is an underwater scene on the basis of a feature value extracted from the captured image is also possible. When whether the subject scene is an underwater scene or not is determined on the basis of the feature value of the captured image, it may be difficult to determine whether the subject scene is an underwater scene depending on the image capturing environment that the image capturing apparatus is in. When it is difficult to determine whether the subject scene is an underwater scene, the determination may frequently vacillate between the underwater scene and the non-underwater scene.

Color balance significantly differs between an underwater environment and a non-underwater environment. When white balance suitable for the underwater environment is applied to, for example, an image to be captured in the non-underwater environment, the image may not have appropriate white balance. On the other hand, when white balance suitable for the non-underwater environment is applied to, for example, an image to be captured in the underwater environment, the image may also not have appropriate white balance.

When white balance control processing is applied to a scene determination result, for example, in the case where determination of an underwater scene and determination of a non-underwater scene are frequently switched, white balance of captured images also frequently changes, which may make unnatural impression on users.

In addition, when a captured image is recorded after white balance control processing is applied to a scene determination result, for example, in the case where determination of an underwater scene and determination of a non-underwater scene are frequently switched, an image having inappropriate white balance may be recorded, which undesirably makes it difficult to record a captured image intended by users.

For example, to record beautiful images captured underwater, it is important to stably determine whether a subject scene is an underwater scene or a non-underwater scene. That is, it is important to appropriately discriminate a specific scene from other scenes to record beautiful images of the specific scene.

Accordingly, it is desirable to appropriately determine a subject scene included in a captured image.

One embodiment of the present invention corresponds to an image capturing apparatus including image capturing means for capturing an image of a subject and generating a captured image of the subject, feature value extracting means for extracting a feature value of the captured image, scene candidate determining means for determining a scene candidate of a subject scene included in the captured image on the basis of the extracted feature value, and scene determining means for determining that the scene candidate is the subject scene included in the captured image when the scene candidate determining means continuously determines scene candidates of an identical kind for a scene determining period taken for determining the subject scene included in the captured image, a method for controlling the same, and a program for allowing a computer to execute the method. When the feature value of the captured image is extracted, the scene candidate of the subject scene included in the captured image is determined on the basis of the extracted feature value, and the scene candidates of the identical kind are continuously determined for the scene determining period, the scene candidate is advantageously determined as the subject scene.

According to the embodiment, the scene determining means may determine the subject scene using different scene determining periods in accordance with a kind of the scene candidate determined by the scene candidate determining means. Accordingly, the subject scene is advantageously determined using the different scene determining periods in accordance with the kind of the determined scene candidate. In this case, the subject scene subjected to the determination performed by the scene determining means may include at least an underwater scene and a non-underwater scene and the scene determining period for the underwater scene may be longer than the scene determining period for the non-underwater scene. In this manner, the subject scene is advantageously determined using the scene determining period for the underwater scene that is set longer than the scene determining period for the non-underwater scene.

According to the embodiment, the image capturing apparatus may further include operation receiving means for receiving an input operation for power-on or power-off, and scene information storage means for storing the subject scene determined upon the operation receiving means receiving the input operation for power-off. The scene determining means may determine, upon the operation receiving means receiving the input operation for power-on, the subject using a shorter scene determining period taken for determining the specific scene when a subject scene stored in the scene information storage means and a scene candidate determined by the scene candidate determining means are an identical specific scene. In this manner, upon the operation receiving means receiving the input operation for power-on, the subject scene is advantageously determined using the shorter scene determining period for the specific scene if the subject scene stored in the scene information storage means and the determined scene candidate are the identical specific scene. In this case, the scene candidate determining means may set, upon the operation receiving means receiving the input operation for power-on, a stricter condition for determining a scene candidate of the specific scene when the subject scene stored in the scene information storage means is the specific scene. In this manner, upon the operation receiving means receiving the input operation for power-on, the condition for determining the scene candidate of the specific scene is advantageously made stricter if the subject scene stored in the scene information storage means is the specific scene.

According to the embodiment, the image capturing apparatus may further include categorization information storage means for storing categorization information that includes a categorization boundary for categorizing, on the basis of the extracted feature value, the subject included in the captured image into a scene candidate of the specific scene or a scene candidate of another scene. The scene candidate determining means may determine the scene candidate by categorizing the subject included in the captured image using the categorization information on the basis of the extracted feature value. In this manner, the scene candidate is advantageously determined by categorizing the subject included in the captured image using the categorization information on the basis of the feature value extracted from the captured image. In this case, the specific scene may be an underwater scene, the categorization information may be information representing a coordinate plane having one axis indicating a value specified by a B component and a G component of color information of the captured image and another axis indicating a value specified by an R component and the G component of the color information of the captured image, the categorization boundary may divide an area on the coordinate plane into an area related to the specific scene and an area related to the other scene, the feature value extracting means may extract, as the feature value, the color information of the captured image, and the scene candidate determining means may determine the scene candidate by categorizing the subject included in the captured image on the basis of a position specified by the extracted color information on the coordinate plane. In this manner, the scene candidate is advantageously determined by extracting the color information of the captured image and categorizing the subject included in the captured image on the basis of the position specified by the extracted color information on the coordinate plane. In this case, the image capturing apparatus may further include operation receiving means for receiving an input operation for power-on or power off, and scene information storage means for storing the subject scene determined upon the operation receiving means receiving the input operation for power-off. The scene candidate determining means may determine, upon the operation receiving means receiving the input operation for power-on, the scene candidate with a narrower area related to the specific scene by moving the categorization boundary corresponding to a part of the one axis indicating a relatively small value when the subject scene stored in the scene information storage means is the specific scene. The scene determining means may determine, upon the operation receiving means receiving the input operation for power-on, the subject scene using a shorter scene determining period taken for determining the specific scene when the subject scene stored in the scene information storage means and a scene candidate determined by the scene candidate determining means are the identical specific scene. In this manner, upon the input operation for power-on being received, the scene candidate is advantageously determined with the narrower area related to the specific scene by moving the categorization boundary corresponding to a part of the one axis indicating a relatively small value when the subject scene stored in the scene information storage means is the specific scene. Upon the input operation for power-on being received, the subject scene is advantageously determined using the shorter scene determining period for determining the specific scene when the subject scene stored in the scene information storage means and the determined scene candidate determined are the identical specific scene.

According to the embodiment, the image capturing apparatus may further include image capturing parameter setting means for setting an image capturing parameter in according with a kind of the determined subject scene, and the image capturing means may generate the captured image in accordance with the set image capturing parameter. In this manner, the image capturing parameter is set in accordance with the determined subject scene and the captured image is advantageously generated in accordance with the set image capturing parameter. In this case, the image capturing parameter setting means may set an image capturing parameter regarding white balance in accordance with a kind of the determined subject scene. In this manner, the image capturing parameter regarding white balance is advantageously set in accordance with the kind of the determined subject scene.

According to the embodiment of the present invention, a subject scene included in a captured image can advantageously be determined appropriately.

BRIEF DESCRIPTION OF THE DRAWINGS

FIG. 4 is a diagram showing an example of scene determining thresholds stored in a scene determining threshold storage unit 350 according to an embodiment of the present invention;

FIG. 5 is a diagram showing an example of an image capturing parameter setting content stored in an image capturing parameter setting unit 380 according to an embodiment of the present invention;

FIG. 9 is a diagram showing an example of scene determining thresholds stored in a scene determining threshold storage unit 550 according to an embodiment of the present invention;

DESCRIPTION OF THE PREFERRED EMBODIMENTS

Embodiments of the present invention will now be described in detail with reference to the accompanying drawings.

Figure 1:
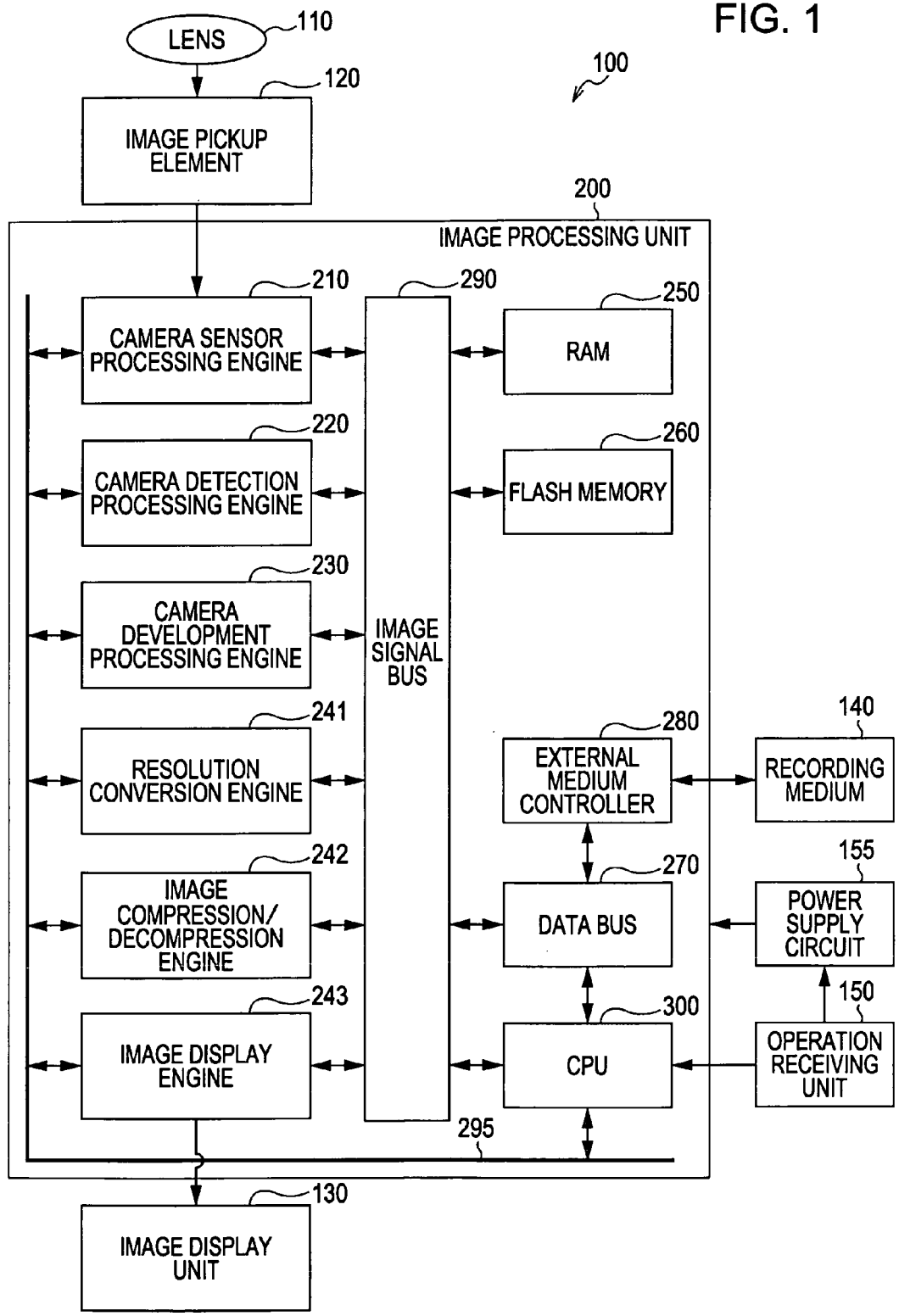
FIG. 1 is a block diagram showing an example of a configuration of an image capturing apparatus 100 according to an embodiment of the present invention.

FIG. 1 is a block diagram showing an example of a configuration of an image capturing apparatus 100 according to an embodiment of the present invention. The image capturing apparatus 100 includes a lens 110, an image pickup element 120, an image display unit 130, a recording medium 140, an operation receiving unit 150, a power supply circuit 155, and an image processing unit 200. For example, the image capturing apparatus 100 can be realized by a digital still camera capable of capturing an image of a subject, generating image data, extracting feature values of this image data through image analysis, and performing various kinds of image processing using the extracted feature values. The image capturing apparatus 100 is also capable of performing, for example, white balance control processing suitable for an underwater environment (hereinafter, referred to as underwater white balance control processing). The image capturing apparatus 100 has an image capturing mode for automatically determining whether a current environment is an underwater environment or not before performing this underwater white balance control processing.

The image processing unit 200 includes a camera sensor processing engine 210, a camera detection processing engine 220, a camera development processing engine 230, a resolution conversion engine 241, an image compression/decompression engine 242, an image display engine 243, a random access memory (RAM) 250, a flash memory 260, a data bus 270, an external medium controller 280, an image signal bus 290, a bus 295, and a central processing unit (CPU) 300. Various image signals are exchanged through the image signal bus 290, whereas various kinds of data are exchanged through the bus 295.

The lens 110 includes a plurality of lenses, such as a zoom lens and a focus lens, for collecting light reflected from a subject. The incoming light from the subject is fed to the image pickup element 120 through the lens 110.

The image pickup element 120 performs photoelectric conversion to convert signals of light coming from a subject through the lens 110 into analog image signals. The image pickup element 120 then outputs the analog image signals having undergone the photoelectric conversion to the camera sensor processing engine 210. For example, a charge coupled device (CCD) sensor or a complementary metal oxide semiconductor (CMOS) sensor can be used as the image pickup element 120.

The camera sensor processing engine 210 performs, on the basis of a control signal supplied from the CPU 300, appropriate camera sensor signal processing, such as noise removal analog signal processing and analog-to-digital (A/D) conversion processing, on the image signals fed from the image pickup element 120. The camera sensor processing engine 210 supplies the digital image signals resulting from these kinds of camera sensor signal processing to the camera detection processing engine 220 and the camera development processing engine 230. According to an embodiment of the present invention, the digital image signals to be supplied to the camera detection processing engine 220 and the camera development processing engine 230 from the camera sensor processing engine 210 are primary color signals of red (R), green (G), and blue (B).

The camera detection processing engine 220 performs, on the basis of a control signal supplied from the CPU 300, processing for detecting various kinds of information used in so-called 3A camera processing on the digital image signals fed from the camera sensor processing engine 210. The camera detection processing engine 220 supplies the various kinds of information extracted in this detection processing to the CPU 300. More specifically, for example, the camera detection processing engine 220 extracts color density values (color detection information values) of R, G, and B from a captured image corresponding to the digital image signals fed from the camera sensor processing engine 210, and supplies the extracted values of R, G, and B to the CPU 300. Meanwhile, the 3A indicates automatic white balance (AWB), automatic exposure (AR), and automatic focus (AF).

The camera development processing engine 230 performs, on the basis of a control signal supplied from the CPU 300, development processing, such as white balance control processing, on the digital image signals fed from the camera sensor processing engine 210. The camera development processing engine 230 then supplies the digital image signals having undergone this development processing to the image display engine 243. More specifically, for example, the CPU 200 calculates a white balance gain and a color reproduction matrix parameter on the basis of the RGB values extracted by the camera detection processing engine 220 and camera setting information set by a user, and sets image capturing parameters related to white balance control processing in the camera development processing engine 230. The CPU 300 also sets, in the camera development processing engine 230, image capturing parameters related to white balance control processing corresponding to a subject scene determined by the CPU 300.

The CPU 300 controls the image processing unit 200 on the basis of various control programs. Control operations performed by the CPU 300 will be described later in detail with reference to FIG. 3.

The RAM 250 temporarily stores programs and data used by the CPU 300 to perform various kinds of processing. The RAM 250 includes various image storage areas for use in image processing.

The flash memory 260 stores data that is kept stored while the image capturing apparatus 100 is OFF. For example, before the image capturing apparatus 100 is turned OFF, a subject scene determined by the CPU 300 is stored in the flash memory 260. Accordingly, the flash memory 260 is used while the image capturing apparatus 100 is OFF.

The resolution conversion engine 241 converts, on the basis of a control signal supplied from the CPU 300, the resolution of various kinds of image data into one suitable for respective kinds of image processing.

The image compression/decompression engine 242 compresses or decompresses, on the basis of control signals supplied from the CPU 300, various kinds of image data in accordance with respective kinds of image processing. More specifically, for example, the image compression/decompression engine 242 compresses or decompresses the various kinds of fed image data into or from image data of the joint photographic experts group (JPEG) format.

The image display engine 243 displays, on the basis of a control signal supplied from the CPU 300, images corresponding to the various kinds of image data on the image display unit 130. For example, the image display engine 243 displays an image corresponding to the image signal having undergone the development processing of the camera development processing engine 230 on the image display unit 130.

The external medium controller 280 is connected to the recording medium 140. The external medium controller 280 outputs image data supplied from the recording medium 140 to the RAM 250 or the like through the data bus 270. The external medium controller 280 also records various kinds of image data on the recording medium 140.

The image display unit 130 displays images corresponding to the various kinds of image data supplied from the image display engine 243. For example, an image corresponding to the image signal having undergone the development processing of the camera development processing engine 230 is displayed on the image display unit 130. The image display unit 130 can be realized by, for example, a liquid crystal display (LCD) and an electronic view finder (EVF). The image display unit 130 may be a touch panel that displays various selection buttons to permit users to perform input operations by touching display areas of these selection buttons.

The recording medium 140 is a recording device for storing the image data supplied from the external medium controller 280. The recording medium 140 stores various kinds of data, such as image data in JPEG format, for example. For example, a semiconductor memory, such as a disk memory card, and a removable recording medium, such as a digital versatile disc (DVD), may be used as the recording medium 140. The recording medium 140 may be included in the image capturing apparatus 100 or removably inserted into the image capturing apparatus 100.

The operation receiving unit 150 receives user operations, and outputs signals corresponding to contents of the received operations to the CPU 300 or the power supply circuit 155.

For example, upon receiving an operation for power-on/power-off, the operation receiving unit 150 outputs power-on/power-off signals to the CPU 300 and the power supply circuit 155.

The power supply circuit 155 supplies the electric power to each unit of the image capturing apparatus 100 in accordance with power-on/power-off signals supplied from the operation receiving unit 150. When the power-on signal is supplied thereto from the operation receiving unit 150, the power supply circuit 155 starts supplying the electric power to the each unit of the image capturing apparatus 100. On the other hand, when the power-off signal is supplied thereto from the operation receiving unit 150, the power supply circuit 155 stops supplying the electric power to each unit of the image capturing apparatus 100. Referring to FIG. 1, some of signal lines carrying the electric power supplied from the power supply circuit are omitted.

Figure 2:
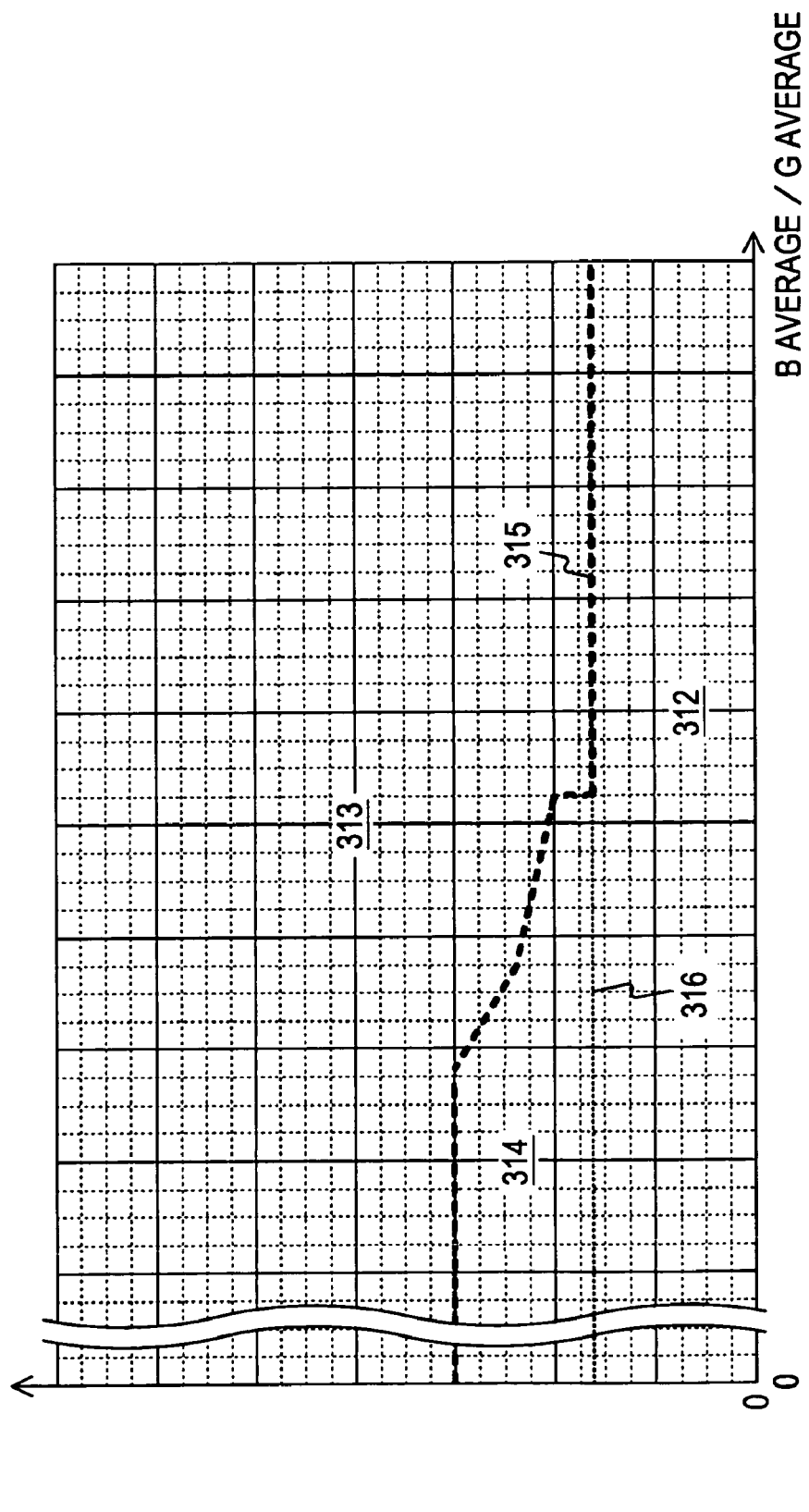
FIG. 2 is a diagram showing an example of a scene candidate determining graph used when an image capturing apparatus 100 according to an embodiment of the present invention determines a scene candidate.

FIG. 2 is a diagram showing an example of a scene candidate determining graph used when the image capturing apparatus 100 according to an embodiment of the present invention determines a scene candidate. A scene candidate determining graph 311 shown in FIG. 2 is for determining a scene candidate using an average of R values, an average of G values, and an average of B values extracted from a captured image. The scene candidate is a scene that can be a candidate for which a subject scene included in captured images is determined. For example, the candidate is determined every several captured images acquired at constant intervals. According to an embodiment of the present invention, a description will be given for a case where either "a underwater scene" or "a non-underwater scene" is determined as the scene candidate. As in the case of the scene candidate, the description will also given for a case where either "an underwater scene" or "a non-underwater scene" is determined as the subject scene. For example, when the same kind of scene candidates is continuously determined for a predetermined period, it is determined that the scene candidates are the subject scenes included in the current captured image. For example, when an "underwater scene" is continuously determined as the scene candidate for 2.0 seconds, the "underwater scene" is determined to be a subject scene included in the current captured image.

In the scene candidate determining graph 311, the horizontal axis represents a value of "(an average of B values)/(an average of G values)" of a captured image, whereas the vertical axis represents a value of "(an average of R values)/(an average of G values)" of the captured image. That is, the scene candidate determining graph 311 is a coordinate plane having the horizontal axis representing a value specified by a B component and a G component of color information of a captured image and the vertical axis representing a value specified by an R component and the G component of the color information of the captured image. The intensity of blue increases on the right side of the horizontal axis of the scene candidate determining graph 311, whereas the intensity of yellow increases on the left side of the horizontal axis. In addition, the intensity of red increases on the upper side of the vertical axis of the scene candidate determining graph 311, whereas the intensity of green increases on the lower side of the vertical axis. With the scene candidate determining graph 311, the scene candidate is determined on the basis of a ratio of color information including a device characteristic. The device characteristic is a characteristic regarding an error caused for each device during manufacture of the device.

The scene candidate determining graph 311 can be determined by performing statistical learning using a plurality of recorded images that have been categorized into the "underwater scene" or the "non-underwater scene", for example. More specifically, a plurality of captured images that have been categorized into either the "underwater scene" or the "non-underwater scene" are stored in a mass storage. Statistical learning is performed regarding these captured images. In this manner, the scene candidate determining graph can be created. As a result of the statistical learning, an area of the graph 311 is categorized into an area (underwater area 312) where many images of the "underwater scene" are plotted, an area (non-underwater area 313) where many images of the "non-underwater scene" are plotted, and an area (coexisting area 314) where both images of the "underwater scene" and images of the "non-underwater scene" are plotted. More specifically, in the scene candidate determining graph 311, an area below a thick line 315 and a thin line 316 corresponds to the underwater area 312. An area enclosed by the vertical axis, the thick line 315, and the thin line 316 corresponds to the coexisting area 314, whereas an area above the thick line 315 corresponds to the non-underwater area 313.

For example, an undersea environment will be described as an example of an underwater environment. Generally, it is often considered that the color of sea is blue. However, in fact, various colors from a color closer to blue to a color closer to green exist. For example, in Izu district of Japan, the undersea color is more likely to be greenish rather than blue. In other districts, there are many areas in which the undersea color is more likely to be bluish. Accordingly, images categorized to the "underwater scene" are often distributed to a broad area of the horizontal axis in the graph 311. In addition, it is known blue light is more likely to pass through but red light is more likely to attenuate in water. Accordingly, images categorized into the "underwater scene" are often distributed to an area corresponding to relatively low vertical axis values in the scene candidate determining graph 311. In this manner, many images categorized into the "underwater scene" are plotted in the underwater area 312, which is a wide horizontal area corresponding to relatively low vertical axis values, in the scene candidate determining graph 311.

In the images categorized into the "underwater scene", the value of blue is less likely to be high while the red light is not attenuated. Accordingly, the coexisting area 314 is located at an area corresponding to relatively low horizontal values. The Sun light is generally plotted in the non-underwater area 313. A procedure of determining a scene candidate using the scene candidate determining graph 311 will be described later in detail with reference to FIG. 3. If the averages of R, G, and B values extracted from a captured image are plotted in the underwater area 312 and the coexisting area 314, the scene candidate is determined as an underwater scene using the scene candidate determining graph 311. If the averages of R, G, and B values are plotted in the non-underwater area 313, the scene candidate is determined to be a non-underwater scene. Such an example will be described later. Accordingly, the scene candidate determining graph 311 is categorization information including a categorization boundary (i.e., the thick line 315) for categorizing, on the basis of color information extracted from a captured image, a subject included in the captured image into either an underwater scene candidate or a non-underwater scene candidate.

Figure 3:
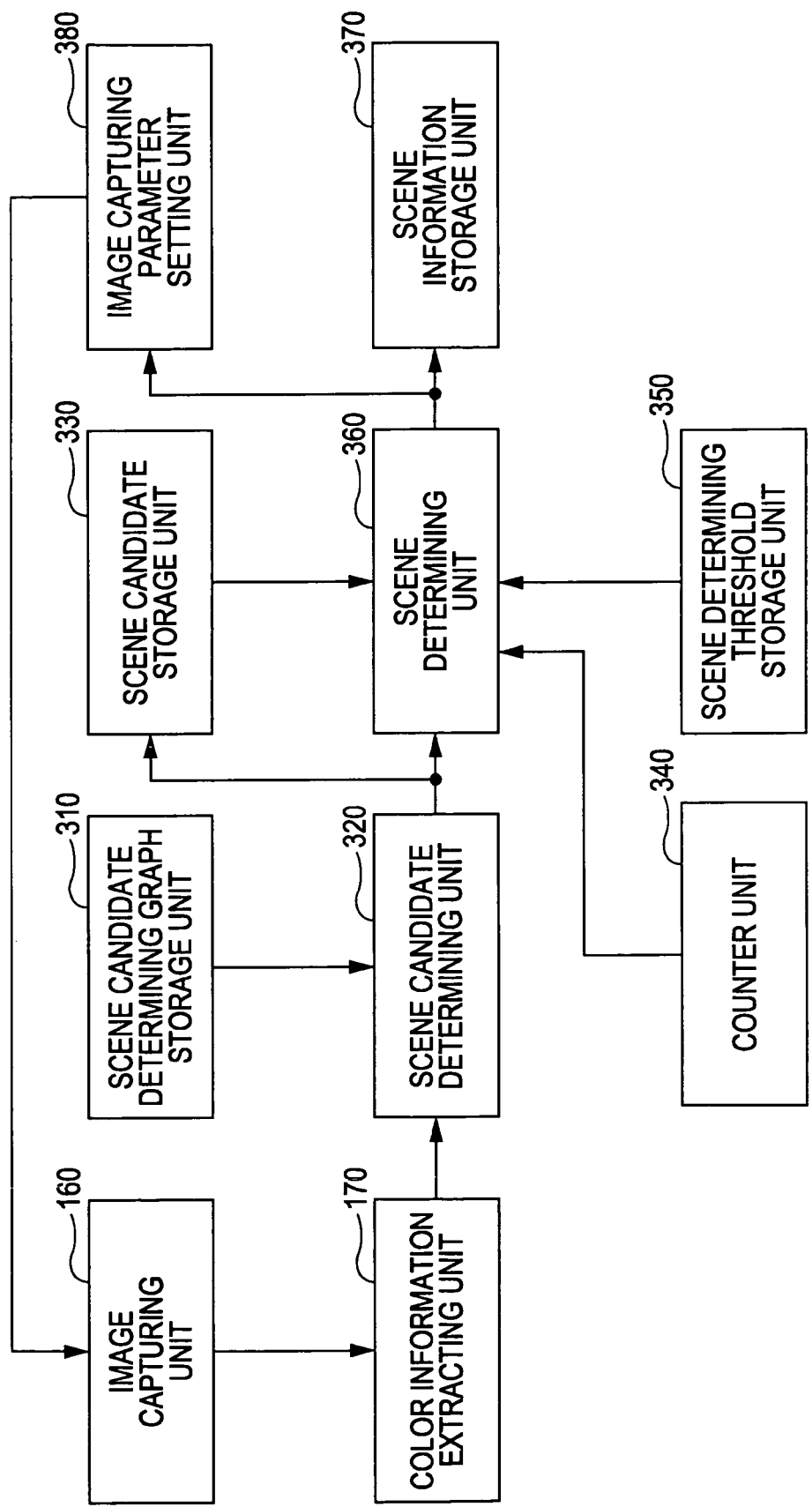
FIG. 3 is a block diagram showing an example of a functional configuration of an image capturing apparatus 100 according to an embodiment of the present invention.

FIG. 3 is a block diagram showing an example of a functional configuration of the image capturing apparatus 100 according to an embodiment of the present invention. The image capturing apparatus 100 includes an image capturing unit 160, a color information extracting unit 170, a scene candidate determining graph storage unit 310, a scene candidate determining unit 320, a scene candidate storage unit 330, a counter unit 340, a scene determining threshold storage unit 350, a scene determining unit 360, a scene information storage unit 370, and an image capturing parameter setting unit 380. Here, the scene candidate determining graph storage unit 310, the scene candidate determining unit 320, the scene candidate storage unit 330, the counter unit 340, the scene determining threshold storage unit 350, the scene determining unit 360, the scene information storage unit 370, and the image capturing parameter setting unit 380 correspond to the CPU 300 shown in, for example, FIG. 1.

The image capturing unit 160 converts incoming light reflected from a subject to generate a captured image in accordance with an image capturing parameter set by the image capturing parameter setting unit 380. The image capturing unit 160 then outputs the generated captured image to the color information extracting unit 170. The image capturing unit 160 corresponds to the lens 110, the image pickup element 120, the camera sensor processing engine 210, and the camera development processing engine 230 shown in FIG. 1.

The color information extracting unit 170 extracts color information of the captured image supplied from the image capturing unit 160. The color information extracting unit 170 then outputs the extracted color information to the scene candidate determining unit 320. More specifically, the color information extracting unit 170 extracts, as the color information, color density values of R, G, and B of a captured image, and outputs the extracted R, G, and B values to the scene candidate determining unit 320. The color information extracting unit 170 corresponds to the camera detection processing engine 220 shown in FIG. 1.

The scene candidate determining graph storage unit 310 stores the scene candidate determining graph 311 shown in FIG. 2. The scene candidate determining graph storage unit 310 supplies the stored scene candidate determining graph 311 to the scene candidate determining unit 320.

The scene candidate determining unit 320 determines, on the basis of the color information supplied from the color information extracting unit 170, a scene candidate for which a subject scene included in the captured image is determined. The scene candidate determining unit 320 then outputs the determined scene candidate to the scene candidate storage unit 330 and the scene determining unit 360. More specifically, the scene candidate determining unit 320 calculates an average of R values, an average of G values, and an average of B values supplied from the color information extracting unit 170. The scene candidate determining unit 320 then calculates a value of "(the average of B values)/(the average of G values)" and a value of "(the average of R values)/(the average of G values)" using the calculated averages of R, G, and B values. The scene candidate determining unit 320 plots the calculated values of "(the average of B values)/(the average of G values)" and "(the average of R values)/(the average of G values)" on the scene candidate determining graph 311 stored in the scene candidate determining graph storage unit 310 to determine the scene candidate on the basis of the plotted position. For example, if the position of the calculated values of "(the average of B values)/(the average of G values)" and "(the average of R values)/(the average of G values)" plotted on the scene candidate determining graph 311 is in the non-underwater area 313, the scene candidate is determined to be a "non-underwater scene". In addition, for example, if the position of the calculated values of "(the average of B values)/(the average of G values)" and "(the average of R values)/(the average of G values)" on the scene candidate determining graph 311 is in the underwater area 312 or the coexisting area 314, the scene candidate is determined to be an "underwater scene".

The scene candidate storage unit 330 sequentially stores a scene candidate supplied from the scene candidate determining unit 320 one by one, and sequentially supplies the stored scene candidate to the scene determining unit 360. More specifically, upon a scene candidate being input to the scene candidate storage unit 330 from the scene candidate determining unit 320, the scene candidate storage unit 330 outputs the scene candidate stored at this time to the scene determining unit 360 and, at the same time, stores the input scene candidate.

The counter unit 340 sequentially supplies a counter value for use in scene determination of the scene determining unit 360 to the scene determining unit 360. For example, the counter unit 340 increments the counter value by 1 every 0.1 second.

The scene determining threshold storage unit 350 stores, for each scene candidate, a threshold for use in scene determination of the scene determining unit 360. For example, a value "20 (2.0 seconds)" is stored in association with the "underwater scene", whereas a value "10 (1.0 second)" is stored in association with the "non-underwater scene". These scene determining thresholds are set as wait time for performing stable scene determination. FIG. 4 shows scene determining thresholds stored in the scene determining threshold storage unit 350.

The scene determining unit 360 determines a subject scene included in a captured image generated by the image capturing unit 160. Upon determining the subject scene, the scene determining unit 360 outputs the determination result to the scene information storage unit 370 and the image capturing parameter setting unit 380. More specifically, the scene determining unit 360 determines whether the scene candidate supplied from the scene candidate determining unit 320 is the same kind as the scene candidate supplied from the scene candidate storage unit 330. If the scene candidates are the same kind, the scene determining unit 360 increments the counter value supplied from the counter unit 340. If the incremented counter value is equal to or greater than a scene determining threshold stored in the scene determining threshold storage unit 350 in association with the scene candidate, the scene determining unit 360 determines that the scene candidate supplied from the scene candidate determining unit 320 is the subject scene included in the captured image. If the scene candidate supplied from the scene candidate determining unit 320 is not the same kind as the scene candidate supplied from the scene candidate storage unit 330, the scene determining unit 360 does not determine the subject scene included in the captured image but performs the following determination processing. When the scene candidate supplied from the scene candidate determining unit 320 is the same kind as the scene candidate supplied from the scene candidate storage unit 330 but the incremented counter value is smaller than the scene determining threshold, the scene determining unit 360 does not determine the subject scene included in the captured image but performs the following determination processing.

The scene information storage unit 370 stores the determination result supplied from the scene determining unit 360 as scene information. More specifically, the scene information storage unit 370 stores either the "underwater scene" or the "non-underwater scene", which is the result determined by the scene determining unit 360. The stored scene information is updated every time the determination result is supplied from the scene determining unit 360.

The image capturing parameter setting unit 380 sets, on the basis of the determination result supplied from the scene determining unit 360, an image capturing parameter used by the image capturing unit 160 to generate a captured image. More specifically, the image capturing parameter setting unit 380 selects, from stored image capturing parameters suitable for each subject scene, an image capturing parameter corresponding to the determination result supplied from the scene determining unit 360, and supplies the selected image capturing parameter to the image capturing unit 160. The content regarding the setting of the image capturing parameters will be described later in detail with reference to FIG. 5.

FIG. 4 is a diagram showing an example of scene determining thresholds stored in the scene determining threshold storage unit 350 according to an embodiment of the present invention. The scene determining threshold storage unit 350 shown in FIG. 4 stores a scene determining threshold 352 in association with a scene candidate 351.

The scene candidate 351 indicates a scene candidate determined by the scene candidate determining unit 320. According to an embodiment of the present invention, since a determination-target scene candidate is either an "underwater scene" or a "non-underwater scene", these two candidates are stored as the scene candidate 351.

The scene determining threshold 352 indicates a threshold for use in scene determination performed on a scene candidate stored as the scene candidate 351. For example, a value "20 (2.0 seconds)" is stored in association with the "underwater scene", whereas a value "10 (1.0 second)" is stored in association with the "non-underwater scene". More specifically, the scene determining unit 360 determines whether the scene candidate is a subject scene using a scene determining threshold stored in association with a scene candidate that has been determined by the scene candidate determining unit 320 immediately before this candidate. The scene determination processing of the scene determining unit 360 is performed every predetermined period (e.g., $\frac{1}{10}$ seconds) in accordance with a synchronizing signal. For example, when the scene determination processing is performed every $\frac{1}{10}$ seconds, wait time for determining the "underwater scene" and wait time for determining the "non-underwater scene" are set to "2.0 seconds" and "1.0 second", respectively. FIG. 4 shows wait time employed when the scene determination processing is performed every $\frac{1}{10}$ seconds.

FIG. 5 is a diagram showing an example of a setting content of image capturing parameters stored in the image capturing parameter setting unit 380 according to an embodiment of the present invention. In an image capturing parameter setting content 381 shown in FIG. 5, a subject scene 382 is stored in association with an image capturing parameter 383.

The subject scene 382 indicates a subject scene determined by the scene determining unit 360. According to an embodiment of the present invention, since a determination-target subject scene is either the "underwater scene" or the "non-underwater scene", these two scenes are stored as the subject scene 382.

The image capturing parameter 383 indicates an image capturing parameter set when each scene stored as the subject scene 382 is determined. For example, "white balance suitable for an underwater environment (hereinafter, referred to as underwater white balance)" is stored in association with the "underwater scene", whereas "white balance suitable for a non-underwater environment (hereinafter, referred to as ordinal white balance)" is stored in association with the "non-underwater scene". In an embodiment of the present invention, a description will be given for an example in which an image capturing parameter regarding white balance is set in accordance with the "underwater scene" or the "non-underwater scene". A parameter set by a user or a parameter calculated in accordance with each scene may be set as the image capturing parameter regarding the white balance. A specific value of each image capturing parameter is not shown in FIG. 5. FIG. 5 simply shows the image captured parameters as "underwater white balance" or "ordinal white balance".

An operation of the image capturing apparatus 100 according to an embodiment of the present invention will now be described with reference to the drawings.

Figure 6:
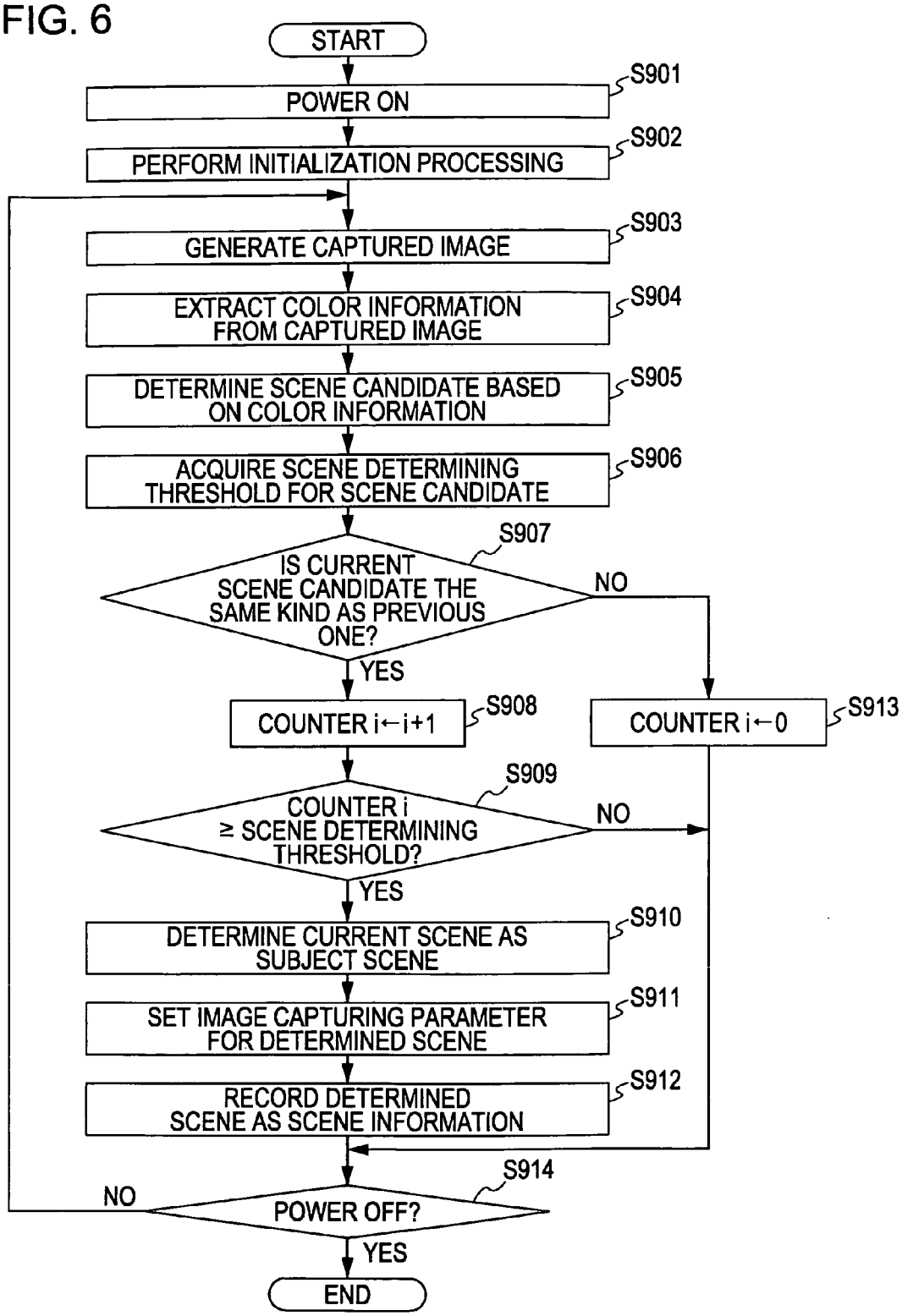
FIG. 6 is a flowchart showing a procedure of image capturing parameter setting processing performed by an image capturing apparatus 100 according to an embodiment of the present invention.

FIG. 6 is a flowchart showing a procedure of image capturing parameter setting processing performed by the image capturing apparatus 100 according to an embodiment of the present invention.

First, the image capturing apparatus is turned ON (STEP S901). Initialization processing is then performed (STEP S902). In the initialization processing, for example, a scene candidate stored in the scene candidate storage unit 330 is deleted, scene information stored in the scene information storage unit 370 is initialized to the "non-underwater scene", the setting content of the image capturing parameter of the image capturing parameter setting unit 380 is initialized to the "non-underwater scene", and a counter i is initialized to "0". The counter i counts stabilization wait time. The image capturing unit 160 then generates a captured image (STEP S903). The color information extracting unit 170 extracts R, G, and B values of the generated captured image (STEP S904). The scene candidate determining unit 320 determines a candidate of a subject scene included in the captured image using the scene candidate determining graph 311 stored in the scene candidate determining graph storage unit 310 on the basis of the R, G, and B values extracted by the color information extracting unit 170 from the captured image (STEP S905). The scene determining unit 360 acquires a scene determining threshold stored in the scene determining threshold storage unit 350 in association with the determined scene candidate (STEP S906).

The scene determining unit 360 determines whether the scene candidate determined by the scene candidate determining unit 320 is the same kind as the scene candidate stored in the scene candidate storage unit 330 (STEP S907). If both of the scene candidates are the same kind (YES at STEP S907), the counter i is incremented by "1" (STEP S908). The scene determining unit 360 then determines whether "counter i≧ scene determining threshold" is satisfied (STEP S909).

If "counter i≦ scene determining threshold" is satisfied (YES at STEP S909), the scene determining unit 360 determines that the scene candidate supplied from the scene candidate determining unit 320 is a subject scene included in the captured image (STEP S910). The image capturing parameter setting unit 380 then sets an image capturing parameter corresponding to the subject scene determined by the scene determining unit 360 (STEP S911). The subject scene determined by the scene determining unit 360 is then stored in the scene information storage unit 370 as scene information (STEP S912). Whether an input operation for turning the image capturing apparatus 100 OFF is performed is determined (STEP S914). If the input operation for turning the image capturing apparatus 100 OFF is not performed (NO at STEP S914), the process returns to STEP S903 and the image capturing parameter setting processing is repeated. If the input operation for turning the image capturing apparatus 100 OFF is performed (YES at STEP S914), the process of the image capturing parameter setting processing terminates.

If the scene candidate determined by the scene candidate determining unit 320 is not the same kind as the scene candidate stored in the scene candidate storage unit 330 (NO at STEP S907), the counter i is initialized to "0" (STEP S913). The process then proceeds to STEP S914. If "counter i≧ scene determining threshold" is not satisfied (NO at STEP S909), the process proceeds to STEP S913.

The description has been given for the example in which the scene determining threshold associated with the scene candidate is acquired (STEP S906) after determination of the scene candidate (STEP S905). However, the scene determining threshold associated to the scene candidate may be acquired after it is determined that the determined scene candidate is the same kind as the scene candidate stored in the scene candidate storage unit 330 (STEP S907).

There are many image capturing apparatuses, such as digital still cameras, that have a function for automatically turning the image capturing apparatuses OFF when an input operation has not been detected for a predetermined period to suppress power consumption of a battery. In addition, many users frequently turn image capturing apparatuses OFF to suppress the power consumption of a battery when performing image capturing with the image capturing apparatuses in water. Accordingly, for example, when image capturing is performed in water using an image capturing apparatus, a recording operation of a captured image may be performed immediately after power-on. However, in the example described above, the underwater scene is not determined unless wait time (2.0 seconds) defined by the scene determining threshold has passed since the power-on. Accordingly, when image capturing is performed in water using an image capturing apparatus immediately after power-on, captured images are recorded before the "underwater white balance" is set as the image capturing parameter and recording of captured images under an image capturing condition expected by a user may not be realized. Accordingly, in an alteration of the embodiment of the present invention to be described below, an example in which captured images are appropriately recorded in response to an image recording operation performed immediately after power-on will be described in detail with reference to the drawings. An image capturing apparatus 500 will be described as an alteration of the embodiment of the present invention. Since the image capturing apparatus 500 has the same configuration as the image capturing apparatus 100 shown in FIG. 1, an illustration and a description regarding an example of a configuration of the image capturing apparatus 500 corresponding to that shown in FIG. 1 are omitted.

Figure 7:
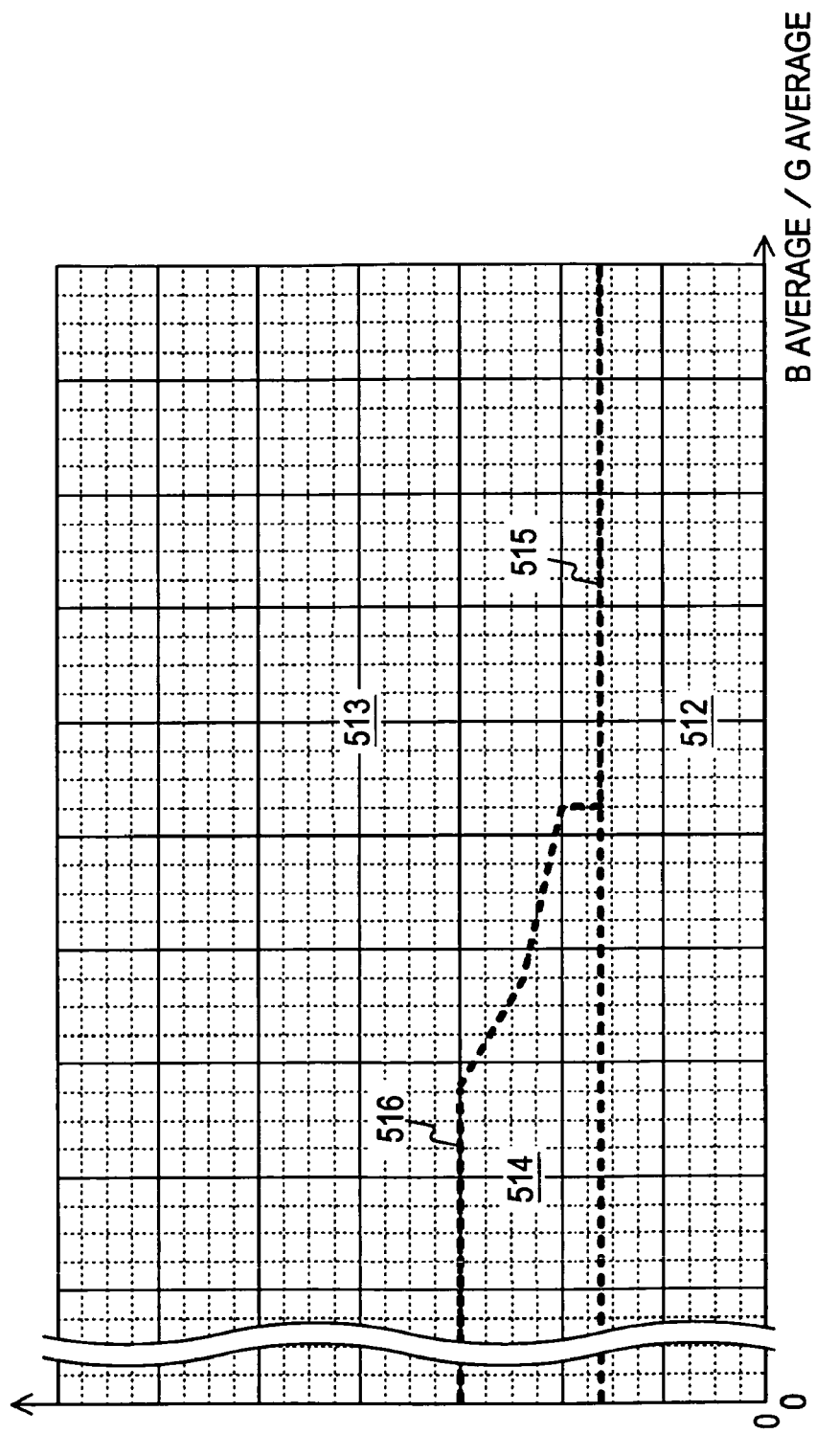
FIG. 7 is a diagram showing an example of a scene candidate determining graph used when an image capturing apparatus 500 according to an embodiment of the present invention determines a scene candidate.

FIG. 7 is a diagram showing an example of a scene candidate determining graph used when the image capturing apparatus 500 according to an embodiment of the present invention determines a scene candidate. Since a scene candidate determining graph 511 shown in FIG. 7 is the same as the scene candidate determining graph 311 shown in FIG. 2 except that the thin line 316 is replaced by a thick line 516, a detailed description regarding each area is omitted.

Determination of a scene candidate performed using the scene candidate determining graph 511 immediately after power-on differs that performed during an ordinal operation period in determination of a scene candidate plotted in a coexisting area 514. More specifically, when scene information is set to an "underwater scene" at the time of power-off and R, G, and B averages of an image captured immediately after power-on are plotted in the coexisting area 514, the scene candidate is determined as a "non-underwater scene". On the other hand, when scene information is set to a "non-underwater scene" at the time of power-off and R, G, and B averages of an image captured immediately after the power-on are plotted in the coexisting area 514, the scene candidate is determined to be an "underwater scene".

As described above, the scene candidate determining graph 511 is categorization information including a categorization boundary for categorizing, on the basis of color information extracted from a captured image, a subject included in the captured image into either an underwater scene candidate or a non-underwater scene candidate. In the case of determining a scene candidate immediately after power-on, the categorization boundary is changed so that a condition for categorizing the subject into a scene candidate of the "underwater scene" becomes stricter if the scene information is set to an "underwater scene" at the time of power-off. More specifically, an ordinal categorization boundary constituted by the right side of a line 515 and a line 516 is changed to a categorization boundary defined by the line 515 so as to set a stricter condition than that for use in scene candidate determination performed in an ordinal state. The candidate determination regarding the coexisting image 514 is performed in the same manner as that regarding the coexisting area 314 shown in FIG. 2 when the timing is not immediately after power-on.

Figure 8:
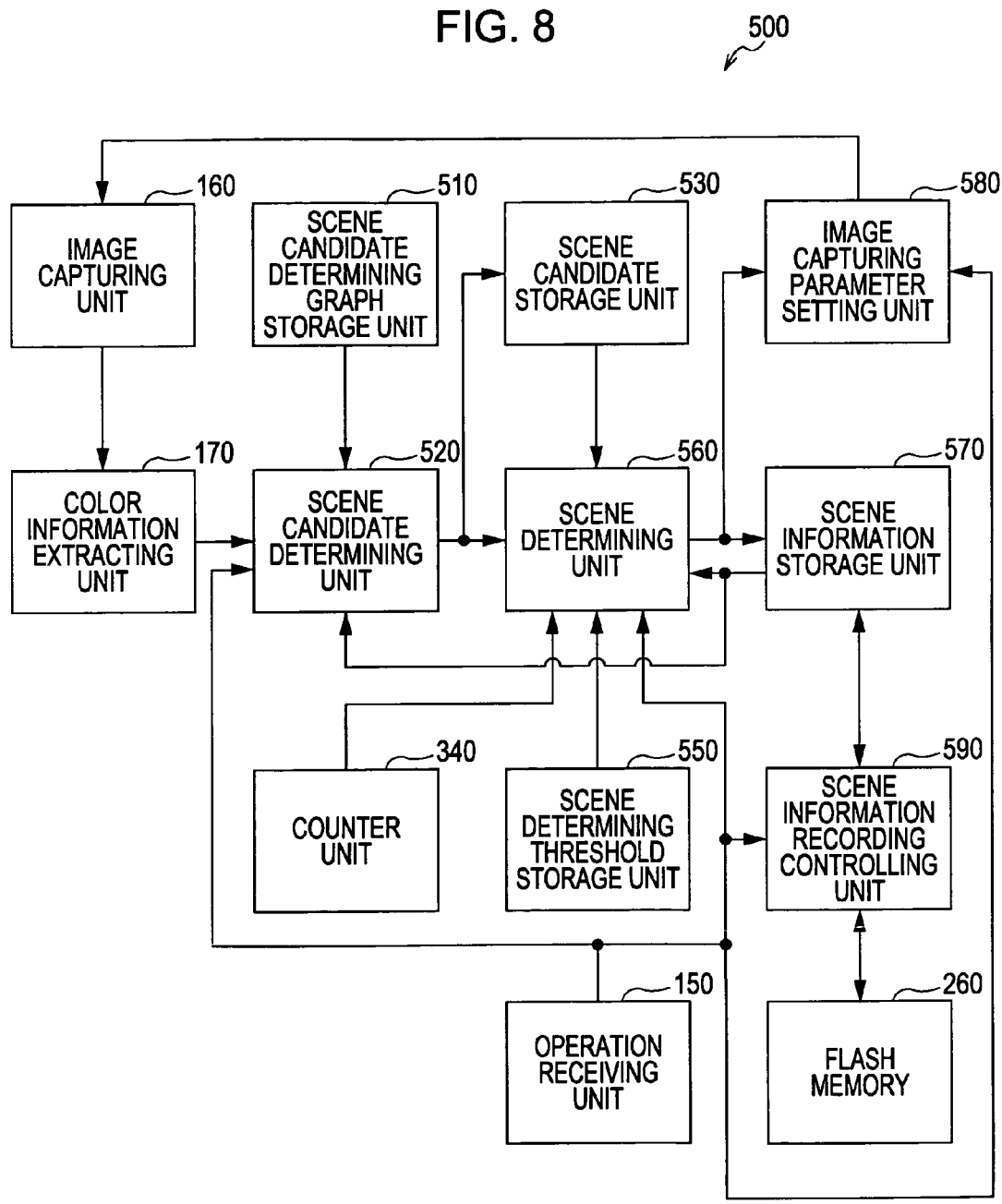
FIG. 8 is a block diagram showing an example of a functional configuration of an image capturing apparatus 500 according to an embodiment of the present invention.

FIG. 8 is a block diagram showing an example of a functional configuration of the image capturing apparatus 500 according to an embodiment of the present invention. The image capturing apparatus 500 has a configuration equivalent to a partially modified configuration of the image capturing apparatus 100 shown in FIG. 3. The image capturing apparatus 500 includes an operation receiving unit 150, an image capturing unit 160, a color information extracting unit 170, a flash memory 260, a scene candidate determining graph storage unit 510, a scene candidate determining unit 520, a scene candidate storage unit 530, a counter unit 340, a scene determining threshold storage unit 550, a scene determining unit 560, a scene information storage unit 570, an image capturing parameter setting unit 580, and a scene information recording controlling unit 590. The scene candidate determining graph storage unit 510, the scene candidate determining unit 520, the scene candidate storage unit 530, the counter unit 340, the scene determining threshold storage unit 550, the scene determining unit 560, the scene information storage unit 570, the image capturing parameter setting unit 580, and the scene information recording controlling unit 590 correspond to the CPU 300 shown in FIG. 1. Since configurations of the image capturing unit 160, the color information extracting unit 170, and the counter unit 340 are the same as those of the image capturing apparatus 100 shown in FIG. 3 and configurations of the operation receiving unit 150 and the flash memory 260 are also the same as those of the image capturing apparatus 100 shown in FIG. 1, a detailed description thereon is omitted. Regarding other configurations, differences from the image capturing apparatus 100 shown in FIG. 3 will be particularly described below.

Upon receiving input operations for turning the image capturing apparatus 500 ON/OFF (upon the image capturing apparatus 500 being turned ON/OFF), the operation receiving unit 150 outputs signals corresponding to the input operations for turning the image capturing apparatus 500 ON/OFF to the scene candidate determining unit 520, the scene determining unit 560, the image capturing parameter setting unit 580, the scene information recording controlling unit 590.

When the image capturing apparatus 500 is turned OFF, the scene information recording controlling unit 590 records scene information (i.e., the "underwater scene" or the "non-underwater scene") stored in the scene information storage unit 570 in the flash memory 260 as backup data. On the other hand, when the image capturing apparatus 500 is turned ON, the scene information recording controlling unit 590 stores the scene information backed up in the flash memory 260 in the scene information storage unit 570.

The scene information storage unit 570 stores the determination result supplied from the scene determining unit 560 as the scene information. When the image capturing apparatus 500 is turned OFF, the scene information stored in the scene information storage unit 570 is recorded in the flash memory 260 under control of the scene information recording controlling unit 590. On the other hand, when the image capturing apparatus 500 is turned ON, the scene information recorded in the flash memory 260 is stored in the scene information storage unit 570 under control of the scene information recording controlling unit 590. More specifically, during an ordinal operation period, the determination result of the scene determining unit 560, i.e., either the "underwater scene" or the "non-underwater scene", is stored in the scene information storage unit 570. Immediately after power-on, the scene information that has been stored in the scene information storage unit 570 at the time of power-off (scene information recorded in the flash memory 260) is stored in the scene information storage unit 570. At the same time, this scene information is supplied to the scene candidate determining unit 520 and the scene determining unit 560.

The image capturing parameter setting unit 580 sets an image capturing parameter used by the image capturing unit 160 to generate a captured image on the basis of the determination result supplied from the scene determining unit 560. Since the image capturing parameter setting content is initialized immediately after power-on, the image capturing parameter setting unit 580 sets the image capturing parameter corresponding to the "non-underwater scene".

The scene candidate determining graph storage unit 510 stores the scene candidate determining graph 511 shown in FIG. 7. The scene candidate determining graph storage unit 510 supplies the stored scene candidate determining graph 511 to the scene candidate determining unit 520.

The scene candidate determining unit 520 determines, on the basis of the color information supplied from the color information extracting unit 170, a scene candidate for which a subject scene included in the captured image is determined. The scene candidate determining unit 520 then outputs the determined scene candidate to the scene candidate storage unit 530 and the scene determining unit 560. Since the ordinal scene candidate determination performed by the scene candidate determining unit 520 is the same as that performed by the scene candidate determining unit 320 shown in FIG. 3, a description thereof is omitted here. Scene candidate determination performed immediately after power-on will be described. For example, when scene information supplied from the scene information storage unit 570 immediately after power-on is the "underwater scene", the candidate scene is determined to be the "non-underwater scene" if the position of values of "(the average of B values)/(the average of G values)" and "(the average of R values)/(the average of G values)" that is calculated from the R, G, and B values supplied from the color information extracting unit 170 and is plotted on the scene candidate determining graph 511 is in the non-underwater area 513 or the coexisting area 514. In addition, for example, if the position of the calculated values of "(the average of B values)/(the average of G values)" and "(the average of R values)/(the average of G values)" on the graph 511 are in the underwater area 512, the scene candidate is determined to be an "underwater scene". That is, when the position on the scene candidate determining graph 511 is in the coexisting area 514 and the scene information supplied from the scene information storage unit 570 immediately after power-on is the "underwater scene", the scene candidate is determined to be a "non-underwater scene". On the other hand, if the scene information supplied from the scene information storage unit 570 immediately after power-on is the "non-underwater scene" or during an ordinal operation period other than the timing immediately after power-on, the scene candidate is determined to be an "underwater scene".

The scene candidate storage unit 530 sequentially stores a scene candidate supplied from the scene candidate determining unit 520 one by one, and sequentially supplies the stored scene candidate to the scene determining unit 560. Since no scene candidate subjected to the previous determination is stored in scene candidate storage unit 530 immediately after power-on, the scene determining unit 560 performs scene determination using the scene information recorded in the flash memory 260 (scene information stored in the scene information storage unit 570) at the time of power-off.

The scene determining threshold storage unit 550 stores, for each scene candidate, a threshold for use in scene determination of the scene determining unit 560. For example, a value "20 (2.0 seconds)" is stored in association with "a ordinal state" of the "underwater scene", whereas a value "1 (0.1 second)" is stored in association with "immediately after power-on and scene information indicating the "underwater scene"" of the "underwater scene". In addition, a value "10 (1.0 second)" is stored in association with the "non-underwater scene". Although the scene determining threshold "1 (0.1 second)" is employed as an example of a scene determining threshold stored in association with the "immediately after power-on and scene information indicating the "underwater scene"" of the "underwater scene" in an embodiment of the present invention, other value that is in time for a user's image capturing operation performed immediately after power-on (a value shorter than the scene determining threshold associated with the "ordinal state" of the "underwater scene") may be set. For example, a value between 0 (0 second) and 5 (0.5 seconds) may be set. FIG. 9 shows the scene determining thresholds stored in the scene determining threshold storage unit 550.

The scene determining unit 560 determines a subject scene included in a captured image generated by the image capturing unit 160. Upon determining the subject scene, the scene determining unit 560 outputs the determination result to the scene information storage unit 570 and the image capturing parameter setting unit 580. Since the scene determination of the scene determining unit 560 performed in the ordinal state is the same as that of the scene determining unit 360 shown in FIG. 3 except for using the scene determining threshold stored in association with the "ordinal state" of the "underwater scene" in the scene determining threshold storage unit 550 when the scene candidate is the "underwater scene", a description thereof is omitted. Scene determination performed immediately after power-on will be described here.

Immediately after power-on, the scene determining unit 560 acquires scene information from the scene information storage unit 570. If the scene information indicates the "underwater scene", the scene determining unit 560 performs the scene determination using the threshold "1 (0.1 second)" stored in association with the "immediately after power on and scene information indicating the "underwater scene"" of the "underwater scene" in the scene determining threshold storage unit 550. If the scene information acquired from the scene information storage unit 570 indicates the "non-underwater scene", the scene determining unit 560 performs the scene determination using a scene determining threshold stored in the scene determining threshold storage unit 550 in association with the scene candidate supplied from the scene candidate determining unit 520.

For example, when the scene information acquired from the scene information storage unit 570 immediately after power-on indicates the "underwater scene" and the scene candidate supplied from the scene candidate determining unit 520 is the "underwater scene", the scene determining unit 560 determines that the "underwater scene" is a subject scene included in the captured image since an incremented counter value (i.e., 1) is equal to or greater than the threshold "1 (0.1 second)" stored in association with the "immediately after power-on and scene information indicating the "underwater scene"" of the "underwater scene" in the scene determining threshold storage unit 550. In addition, for example, when the scene information acquired from the scene information storage unit 570 immediately after power-on indicates the "non-underwater scene" and the scene candidate supplied from the scene candidate determining unit 520 is the "non-underwater scene", the scene determining unit 560 does not determine the subject scene included in the captured image since the incremented counter value (i.e., 1) is smaller than the threshold "10 (1.0 second)" stored in association with the "non-underwater scene" in the scene determining threshold storage unit 550. If the scene candidate supplied from the scene candidate determining unit 520 does not match the scene information acquired from the scene information storage unit 570 or if the scene candidate supplied from the scene candidate determining unit 520 does match the scene information acquired from the scene information storage unit 570 but the incremented counter value is smaller than the scene determining threshold, the scene determining unit 560 does not determine the subject scene included in the captured image but performs the next determination processing.

As described above, if the scene information stored in the scene information storage unit 570 at the time of power-off indicates the "underwater scene" and the scene candidate determined by the scene candidate determining unit 520 immediately after power-on is the "underwater scene", the subject scene included in the captured image is determined as the "underwater scene". Thus, the determination of the "underwater scene" can be performed rapidly immediately after power-on. Accordingly, when a user performs image capturing in water using the image capturing apparatus 500 immediately after power-on, it is possible to prevent the captured image from being recorded before the "underwater white balance" is set as the image capturing parameter and to record the captured image under an image capturing condition expected by the user. Since the scene candidate determining unit 520 determines a scene candidate under a condition, which is stricter than that used in the ordinal state, immediately after power-on, it is possible to rapidly determine the "underwater scene" while maintaining the accuracy of the scene determination.

FIG. 9 is a diagram showing an example of scene determining thresholds stored in the scene determining threshold storage unit 550 according to an embodiment of the present invention. A scene candidate 551 is stored in association with a scene determining threshold 552 in the scene determining threshold storage unit 550 shown in FIG. 9. Since the configuration of the scene determining threshold storage unit 550 is the same as that of the scene determining threshold storage unit 350 shown in FIG. 4 except for addition of the "immediately after power-on and scene information indicating the "underwater scene"" of the "underwater scene" to the scene candidate 551 and addition of the threshold "1 (0.1 second)" in association therewith, a description thereof is omitted here. The "ordinal state" of the "underwater scene" stored at the scene candidate 551 is equivalent to the "underwater scene" stored at the scene candidate 351 shown in FIG. 4. By performing the scene determination after categorizing the current state into the "immediately after power-on and scene information indicating the "underwater scene"" or the "ordinal state" when the scene candidate is the "underwater scene", it is possible to rapidly perform determination of the "underwater scene" when the scene information indicates the "underwater scene".

An operation of the image capturing apparatus 500 according to an embodiment of the present invention will be described with reference to the drawings.

Figure 10:
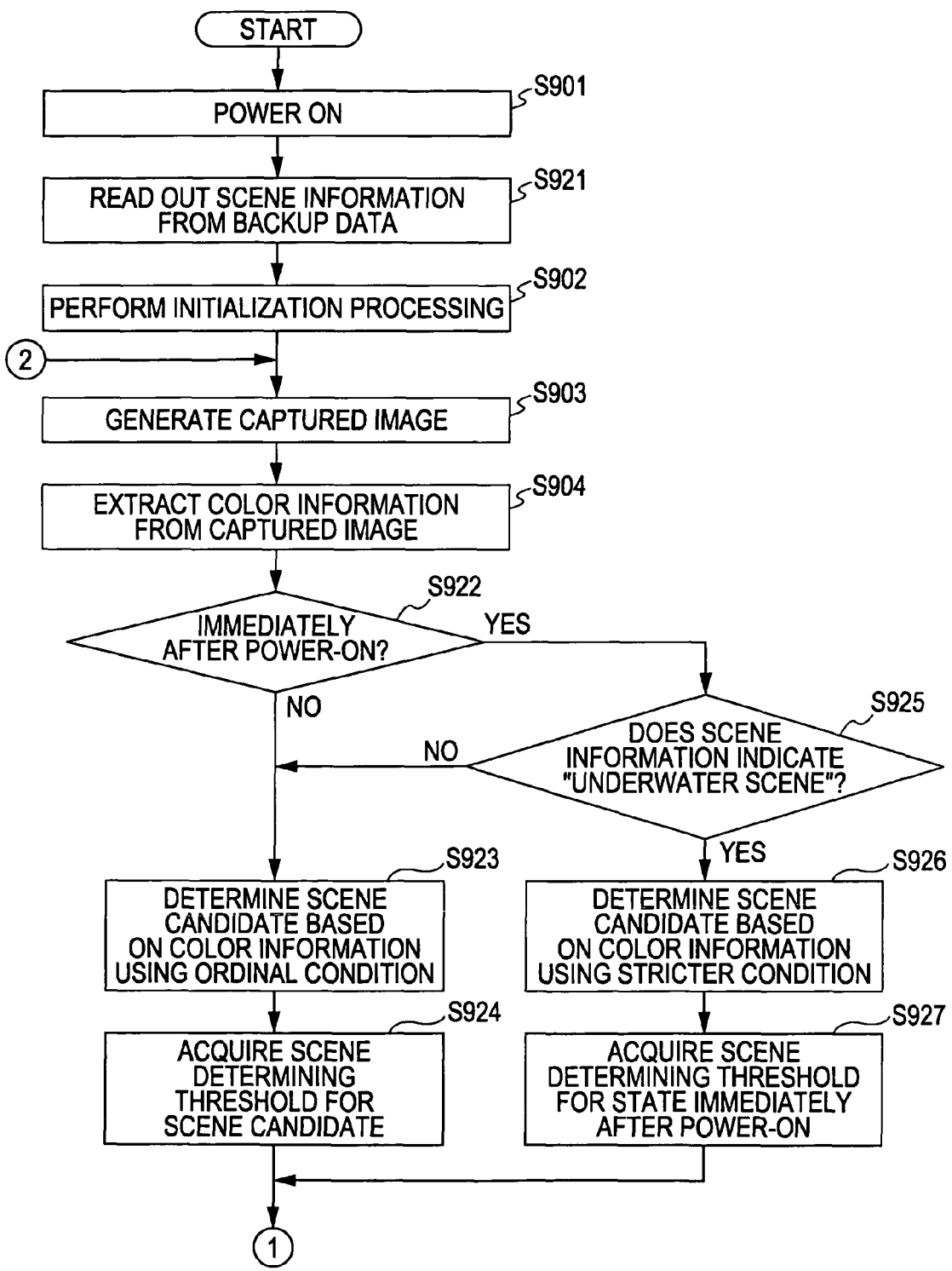
FIG. 10 is a flowchart showing a procedure of image capturing parameter setting processing performed by an image capturing apparatus 500 according to an embodiment of the present invention.
Figure 11:
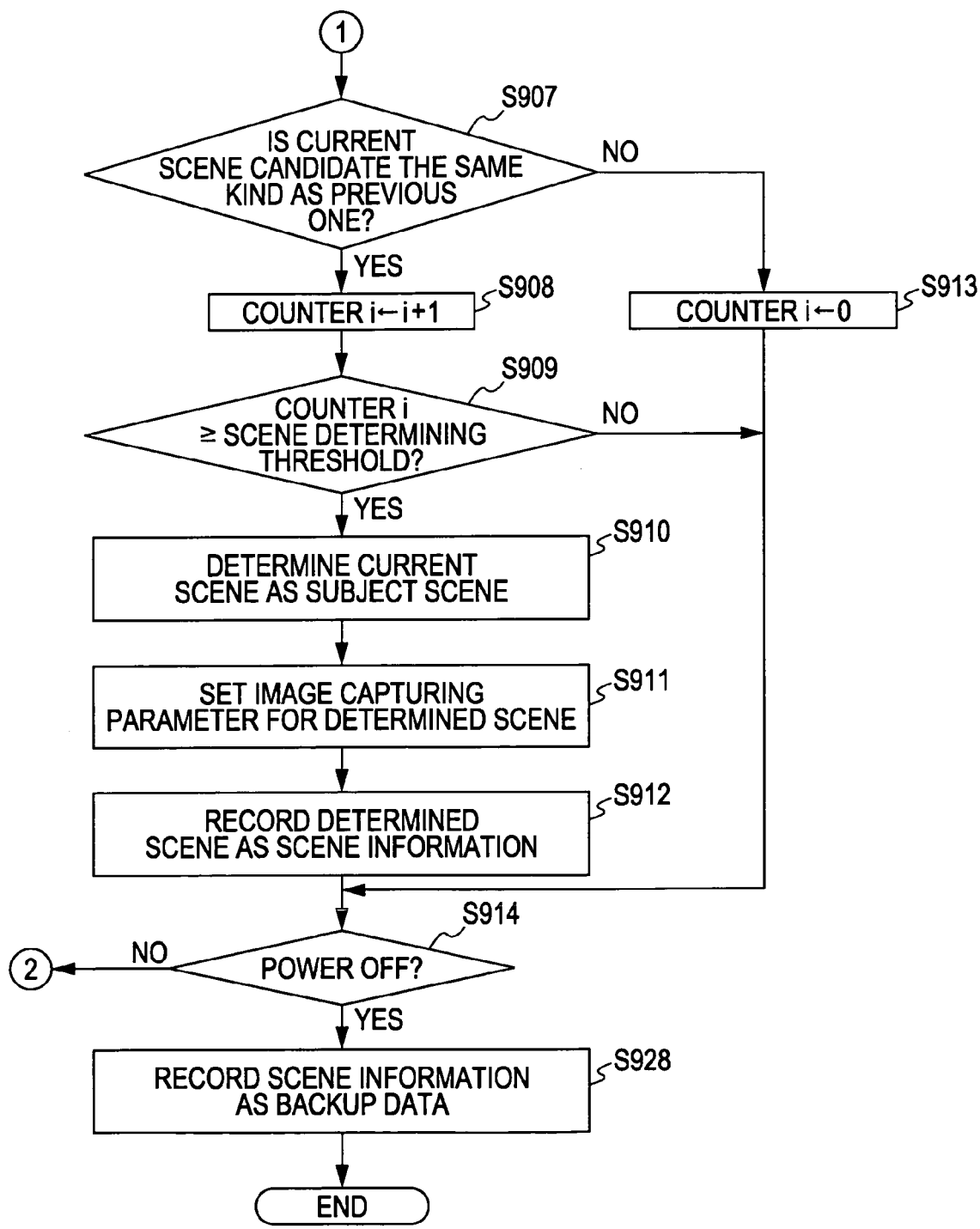
FIG. 11 is a flowchart showing a procedure of image capturing parameter setting processing performed by an image capturing apparatus 500 according to an embodiment of the present invention.

FIGS. 10 and 11 are flowcharts showing a procedure of image capturing parameter setting processing performed by the image capturing apparatus 500 according to an embodiment of the present invention. Since STEPs S901 to S904 and S907 and S914 shown in FIGS. 10 and 11 are the same as STEPs S901 to S904 and S907 to S914 shown in FIG. 6, respectively, a description thereof is omitted here.

After power-on of the image capturing apparatus 500 (STEP S901), the scene information recording controlling unit 590 reads out scene information from backup data recorded in the flash memory 260 and stores the read out scene information in the scene information storage unit 570 (STEP S921).

After the color information extracting unit 170 extracts R, G, and B values of a captured image (STEP S904), the scene candidate determining unit 520 determines whether the current state is immediately after power-on (STEP S922). If the current state is not immediately after power-on (NO at STEP S922), the scene candidate determining unit 520 determines, on the basis of the R, G, and B values extracted by the color information extracting unit 170 from the captured image, a candidate of a subject scene included in the captured image under an ordinal condition using the scene candidate determining graph 511 stored in the scene candidate determining graph storage unit 510 (STEP S923). Here, the ordinal condition using the scene candidate determining graph 511 is a condition for determining that the scene candidate is an "underwater scene" if the R, G, and B averages extracted from the captured image are plotted in the coexisting area 514. The scene determining unit 560 then acquires a scene determining threshold stored in the scene determining threshold storage unit 550 in association with the scene candidate determined by the scene candidate determining unit 520 (STEP S924).

If the current state is determined to be immediately after power-on (YES at STEP S922), the scene candidate determining unit 520 determines whether the scene information stored in the scene information storage unit 570 indicates the "underwater scene" (STEP S925). If the scene information stored in the scene information storage unit 570 does not indicate the "underwater scene" (NO at STEP S925), the process proceeds STEP S923. If the scene information stored in the scene information storage unit 570 indicates the "underwater scene" (YES at STEP S925), the scene candidate determining unit 520 determines, on the basis of the R, G, and B values extracted by the color information extracting unit 170 from the captured image, a candidate of a subject scene included in the captured image under a stricter condition using the scene candidate determining graph 511 stored in the scene candidate determining graph storage unit 510 (condition employed immediately after power-on) (STEP S926). Here, the stricter condition using the scene candidate determining graph 511 is a condition for determining that the scene candidate is a "non-underwater scene" when the R, G, and B averages extracted from the captured image are plotted in the coexisting area 514. The scene determining unit 560 then acquires the scene determining threshold associated with the "immediately after power on and scene information indicating the "underwater scene"" of the "underwater scene" stored in the scene determining threshold storage unit 550 (STEP S927). The scene determination processing is then performed using the scene determining threshold acquired at STEP S924 or S927.

If an input operation for power-off is detected (YES at STEP S914), the scene information recording controlling unit 590 records the scene information stored in the scene information storage unit 570 (i.e., the "underwater scene" or the "non-underwater scene") in the flash memory 260 as backup data (STEP S928) and terminates the operation of the image capturing parameter setting processing.

Although the above description has been given for the example where scene determination processing is performed in a power-on state, a scene determining mode, which is an image capturing mode for performing scene determination processing, may be set through a user's manual operation and the scene determination processing may be performed only when this scene determining mode is set. If the setting of the scene determining mode is canceled, the initialization processing shown in STEP S902 is performed.

As described above, according to the embodiments of the present invention, white balance of a captured image displayed on the image display unit 130 can be stabilized, even if image capturing is performed in a state where determination of the underwater scene changes, by providing a stabilization wait period (i.e., the scene determining threshold) taken for determining a subject scene included in the captured image. In this manner, captured images making natural impression on users can be provided. In addition, during capturing and recording of a video or still images, the white balance of the recorded images can be stabilized. For example, when the white balance frequently changes, users may concern about the camera performance. Thus, it is important to stabilize the white balance.

In addition, when recording of captured images may fail because of application of underwater white balance processing in a non-underwater environment rather than application of non-underwater white balance processing in an underwater environment, the stabilization wait period for the "underwater scene" is set longer than the stabilization wait period for the "non-underwater scene", whereby the failure in recording of the captured images can be prevented.

In addition, by adjusting, on the basis of scene information at the time of power-off, the stabilization wait period for use in determination of the underwater scene performed immediately after power-on, the image capturing parameter for use in underwater white balance control processing can be appropriately set. For example, when an image capturing apparatus is turned OFF in water after the scene is stably determined as the "underwater scene" and is then turned ON, a subject scene candidate can be rapidly determined as the "underwater scene" by shortening the stabilization wait period. In this manner, the underwater white balance control processing can be appropriately performed and the failure in recording of captured images can be prevented.

Since color detection information for use in white balance control processing can be used as a feature value for use in the scene determination, the cost of the apparatus can be suppressed and the power consumption can also be reduced. Furthermore, subject scene determination can be realized by software. Accordingly, the cost of the apparatus can be reduced, for example, by omitting dedicated hardware, such as an external pressure sensor, for determining an underwater scene.

Each engine employed in the embodiments of the present invention may be realized by hardware or software.

Although the description has been given for the example in which a scene candidate is determined using averages of R, G, and B values extracted from a captured image as color information in the embodiments of the present invention, other kinds of color information, such as a luminance histogram and hue information, may be used to determine the scene candidate. Additionally, the scene candidate may be determined using other feature values extracted from the captured image.

A value desired by a user may be set as the scene determining threshold. For example, a user who frequently turns an image capturing apparatus ON/OFF in water may set a relatively small value as a scene determining threshold associated to the "immediately after power-on and scene information indicating an "underwater scene"" of the "underwater scene" stored in the scene determining threshold storage unit 550.

Although the description has been given for the example in which an image capturing parameter regarding white balance is set as an image capturing parameter in the embodiments of the present invention, the embodiments of the present invention can also be applied to, for example, a case of performing AE processing by setting an image capturing parameter regarding the AE.

Although the description has been given for the example of discriminating an underwater scene from a non-underwater scene as the subject scene in the embodiments of the present invention, the embodiments of the present invention can be applied to, for example, a case of discriminating a landscape scene from a non-landscape scene. In addition, the embodiments of the present invention can be applied to image capturing apparatuses, such as a camcorder and a mobile phone having an image capturing unit.

The embodiments of the present invention are only examples of embodying the present invention and have a correspondence with each element described in the attached claims as shown below. However, the present invention is not limited to this particular case and can be variously modified within a scope not departing from the spirit of the present invention.

According to one embodiment, image capturing means corresponds to, for example, the image capturing unit 160. Feature value extracting means corresponds to, for example, the color information extracting unit 170. Scene candidate determining means corresponds to, for example, the scene candidate determining unit 320 or 520. Additionally, scene determining means corresponds to, for example, the scene determining unit 360 or 560.

According to another embodiment, operation receiving means corresponds to, for example, the operation receiving unit 150. Additionally, scene information storage means corresponds to, for example, the flash memory 260.

According to still another embodiment, categorization information storage means corresponds to, for example, the scene candidate determining graph storage unit 310 or 510.

According to a further embodiment, operation receiving means corresponds to, for example, the operation receiving unit 150, whereas scene information storage means corresponds to, for example, the flash memory 260.

According to a still further embodiment, image capturing parameter setting means corresponds to, for example, the image capturing parameter setting unit 380 or 580.

According to another embodiment, a step of capturing an image corresponds to, for example, STEP S903. A step of extracting a feature value corresponds to, for example, STEP S904. A step of determining a scene candidate corresponds to, for example, STEPs S905, S923, and S926. Additionally, a step of determining a scene corresponds to, for example, STEP S910.

The procedure described in the embodiments of the present invention may be considered as a method having a series of steps and may be considered as a program for allowing a computer to execute the series of steps or a recording medium storing the program.

It should be understood by those skilled in the art that various modifications, combinations, sub-combinations and alterations may occur depending on design requirements and other factors insofar as they are within the scope of the appended claims or the equivalents thereof.

What is claimed is:

1. A method for controlling an image capturing apparatus, comprising the steps of:
   capturing an image of a subject and generating a captured image of the subject;
   extracting a feature value of the captured image;
   determining a scene candidate of a subject scene included in the captured image on the basis of the extracted feature value; and
   determining the scene candidate as the subject scene included in the captured image when scene candidates of an identical kind are continuously determined for a scene determining period taken for determining the subject scene included in the captured image.

2. A non-transitory recording medium having stored thereon a program for allowing a computer to execute a method, the method comprising the steps of:
   capturing an image of a subject and generating a captured image of the subject;
   extracting a feature value of the captured image;
   determining a scene candidate of a subject scene included in the captured image on the basis of the extracted feature value; and
   determining a scene candidate of a subject scene included in the captured image on the basis of the extracted feature value; and
   determining the scene candidate as the subject scene included in the captured image when scene candidates of an identical kind are continuoulsy determining the subject scene included in the captured image.

3. An image capturing apparatus comprising:
   an image capturing unit configured to capture an image of a subject and generate a captured image of the subject;
   a feature value extracting unit configured to extract a feature value of the captured image;
   a scene candidate determining unit configured to determine a scene candidate of a subject scene included in the captured image on the basis of the extracted feature value; and
   a scene determining unit configured to determine that the scene candidate is the subject scene included in the captured image when the scene candidate determining unit continuously determines scene candidates of an identical kind for a scene determining period taken for determining the subject scene included in the captured image.

4. The apparatus according to claim 3, wherein the scene determining unit determines the subject scene using different scene determining periods in accordance with a kind of the scene candidate determined by the scene candidate determining unit.

5. The apparatus according to claim 4, wherein the subject scene subjected to the determination performed by the scene determining unit includes at least an underwater scene and a non-underwater scene, and wherein the scene determining period for the underwater scene is longer than the scene determining period for the non-underwater scene.

6. The apparatus according to claim 3, further comprising:
an operation receiving unit configured to receive an input operation for power-on or power-off; and
a scene information storage unit configured to store the subject scene determined upon the operation receiving unit receiving the input operation for power-off,
wherein the scene determining unit determines, upon the operation receiving unit receiving the input operation for power-on, the subject scene using a shorter scene determining period taken for determining the specific scene when a subject scene stored in the scene information storage unit and a scene candidate determined by the scene candidate determining unit are an identical specific scene.

7. The apparatus according to claim 6, wherein the scene candidate determining unit sets, upon the operation receiving unit receiving the input operation for power-on, a stricter condition for determining a scene candidate of the specific scene when the subject scene stored in the scene information storage unit is the specific scene.

8. The apparatus according to claim 3, further comprising:
a categorization information storage unit configured to store categorization information that includes a categorization boundary for categorizing, on the basis of the extracted feature value, the subject included in the captured image into a scene candidate of the specific scene or a scene candidate of another scene,
wherein the scene candidate determining unit determines the scene candidate by categorizing the subject, included in the captured image using the categorization information on the basis of the extracted feature value.

9. The apparatus according to claim 8, wherein the specific scene is an underwater scene, and
wherein the categorization information is information representing a coordinate plane having one axis indicating a value specified by a B component and a G component of color information of the captured image and another axis indicating a value specified by an R component and the G component of the color information of the captured image, and
wherein the categorization boundary divides an area on the coordinate plane into an area related to the specific scene and an area related to the other scene, and
wherein the feature value extracting unit extracts, as the feature value, the color information of the captured image, and
wherein the scene candidate determining unit determines the scene candidate by categorizing the subject included in the captured image on the basis of a position specified by the extracted color information on the coordinate plane.

10. The apparatus according to claim 9, further comprising:
an operation receiving unit configured to receive an input operation for power-on or power-off; and
a scene information storage unit configured to store the subject scene determined upon the operation receiving unit receiving the input operation for power-off, wherein
the scene candidate determining unit determines, upon the operation receiving unit receiving the input operation for power-on, the scene candidate with a narrower area related to the specific scene by moving the categorization boundary corresponding to a part of the one axis indicating a relatively small value when the subject scene stored in the scene information storage unit is the specific scene, and
wherein the scene determining unit determines, upon the operation receiving unit receiving the input operation for power-on, the subject scene using a shorter scene determining period taken for determining the specific scene when the subject scene stored in the scene information storage unit and a scene candidate determined by the scene candidate determining unit are the identical specific scene.

11. The apparatus according to claim 3, further comprising:
an image capturing parameter setting unit configured to set an image capturing parameter in according with a kind of the determined subject scene,
wherein the image capturing unit generates the captured image in accordance with the set image capturing parameter.

12. The apparatus according to claim 11, wherein the image capturing parameter setting unit sets an image capturing parameter regarding white balance in accordance with a kind of the determined subject scene.

13. A method for controlling an image processing apparatus, comprising the steps of:
extracting a feature value of an image by use of a feature value extracting unit;
determining a scene candidate of a subject scene included in the image on the basis of the extracted feature value; and
determining the scene candidate as the subject scene included in the image when the scene candidates of an identical kind are continuously determined for a scene determining period taken for determining the subject scene included in the image.

14. An image processing apparatus comprising:
a feature value extracting unit configured to extract a feature value of an image;
a scene candidate determining unit configured to determine a scene candidate of a subject scene ionclude in the image on the basis of the extracted feature value; and
a scene determining unit configured to determine that the scene candidate is the subject scene included in the image when the scene candidate determining unit continuously determines scene candidates of an identical kind for a scene determining period taken for determining the subject scene included in the image;
in which the feature value extracting unit, the scene candidate determining unit, and the scene determining unit are each configured as hardware.

15. The apparatus according to claim 14, wherein the scene determining unit determines the subject scene using different scene determining periods in accordance with a kind of the scene candidate determined by the scene candidate determining unit.

16. The apparatus according to claim 14, wherein the subject scene subjected to the determination preformed by the scene determining unit includes at least an underwater scene and a non-underwater scene, and
wherein the scene determining period for the underwater scene is longer than the scene determining period for the non-underwater scene.

17. The apparatus according to claim 14, further comprising:
an operation receiving unit configured to receive an input operation for power-on or power-off; and a scene information storage unit configured to store the subject scene determined upon the operation receiving unit receiving the input operation for power-off, wherein the scene determining unit determines, upon the operation receiving unit receiving the input operation for power-on, the subject scene using a shorter scene determining period taken for determining the specific scene when a subject scene stored in the scene information storage unit and a scene candidate determined by the scene candidate determining unit are an identical specific scene.

18. The apparatus according to claim 14, wherein the scene candidate determining unit sets, upon the operation receiving unit receiving the input operation for power-on, a stricter condition for determining a scene candidate of the specific scene when the subject scene stored in the scene information storage unit is the specific scene.

* * * * *